W. R. WILKINSON.
VINE CUTTER.
APPLICATION FILED OCT. 20, 1915.
1,179,257. Patented Apr. 11, 1916.
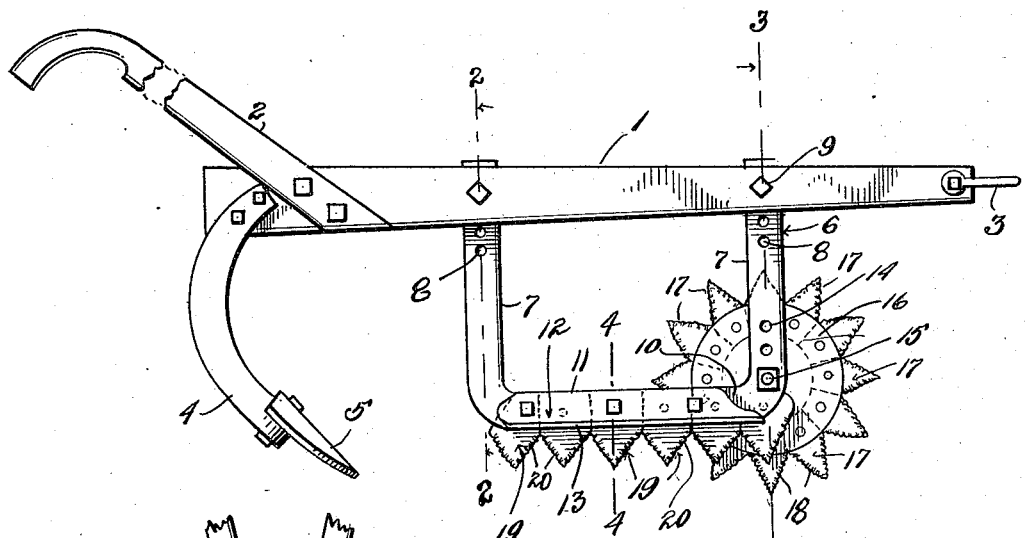
Fig. 1.
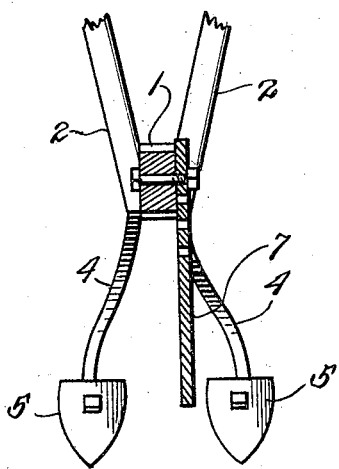
Fig. 2.
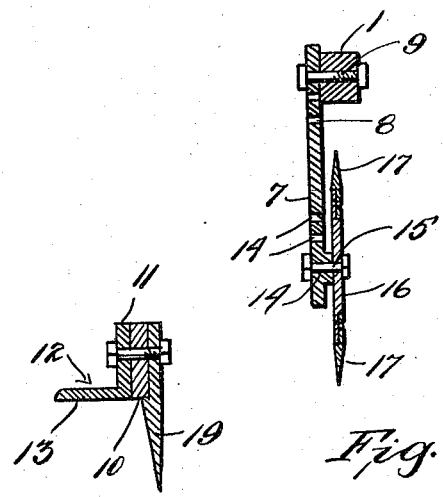
Fig. 3.
Fig. 4.
Inventor
W. R. Wilkinson
Witnesses
By
Attorneys
THE COLUMBIA PLANOGRAPH CO., WASHINGTON, D. C.

UNITED STATES PATENT OFFICE.

WILLIAM R. WILKINSON, OF HAGAN, GEORGIA.

VINE-CUTTER.

1,179,257.  Specification of Letters Patent.  Patented Apr. 11, 1916.

Application filed October 20, 1915.  Serial No. 56,889.

*To all whom it may concern:*

Be it known that I, WILLIAM R. WILKINSON, a citizen of the United States, residing at Hagan, in the county of Evans, State of Georgia, have invented certain new and useful Improvements in Vine-Cutters; and I do hereby declare the following to be a full, clear, and exact description of the invention, such as will enables others skilled in the art to which it appertains to make and use the same.

The present invention is directed to improvements in vine cutters adapted to be attached to a plow for digging sweet potatoes, and has for its object to so construct a device of this character that it can be conveniently attached to the conventional form of potato digging plow, and when in place thereon will effectively cut the vines of the growing potatoes.

A further object of the invention is to provide a cutter of this type which can be conveniently adjusted vertically with respect to the plow beam, and further to provide means whereby the cutting depth of the teeth will be regulated.

With these and other objects in view, this invention resides in the novel features of construction, formation, combination and arrangement of parts to be hereinafter more fully described, claimed and illustrated in the accompanying drawing, in which:

Figure 1 is a side elevation of the device showing it applied to a plow. Fig. 2 is a sectional view on line 2—2 of Fig. 1. Fig. 3 is a similar view on line 3—3 of Fig. 1. Fig. 4 is a similar view on line 4—4 of Fig. 1.

Referring to the drawing 1 indicates the plow beam having fixed to its rear end the handles 2, while the forward end of said beam is provided with a conventional form of clevis 3. Having their upper ends fixed adjacent the rear end of the beam 1 are standards 4, the lower ends of which are provided with removable shovels 5 of a conventional form.

A U-shaped hanger 6 is provided and has its arms 7 formed with a plurality of vertically spaced perforations 8 which are adapted to be engaged by the clamping bolts 9 which are engaged transversely of the beam 1. Thus it will be seen that the bolts 9 can be engaged in selected perforations 8 so as to hold the hanger 6 in adjusted position.

Bolted upon one side of the horizontal bar 10 of the hanger 6 is the vertical web 11 of the slide 12, the horizontal web 13 thereof being adapted to engage the earth when the device is in use and is of sufficient width to prevent the slide from being embedded in the earth.

The forward arm 7 of the hanger 6 is provided with a plurality of vertically spaced bearings 14 which are interchangeably engaged by the shaft 15, said shaft having rotatably mounted thereon a disk 16. Detachably connected to the disk 16 is a plurality of teeth 17, said teeth having corrugated cutting edges 18. The bar 10 of the hanger 6 has detachably connected thereto a plurality of teeth 19, which are also provided with corrugated cutting edges 20. By providing the bearings 14 it is obvious that the shaft 15 can be adjusted so as to regulate the cutting action of the teeth 17.

In operation when the plow is propelled it is obvious that rotary movement will be imparted to the disk 16, which will cause the teeth 17 carried thereby to sever the vines, and as the plow continues to advance the teeth 17 will pass the adjacent teeth 19 so as to shear any of the vines which are tough and not easily cut, it being of course understood that the teeth 19 will aid in cutting the vine.

While I have illustrated and described a particular embodiment of my invention, I have merely done so for the sake of convenience and do not wish to be limited to that particular embodiment as it is obvious that numerous changes may be made within the details of construction thereof without in any way departing from the spirit of the invention or exceeding the scope of the appended claim.

What I claim is:—

In combination with a plow beam, a hanger having vertical arms, said arms being connected at their lower ends by a horizontal bar, means for adjustably connecting the arms to the beam, a shaft adjustably associated with one of the arms, a disk rotatably connected to the shaft, cutting teeth carried by the disk, a slide having a vertical and horizontal web, the former being connected to the horizontal bar while the latter engages the ground, and cutting teeth detachably connected to the bar, said slide serving to regulate the cutting depth of the first and second named teeth.

In testimony whereof, I affix my signature, in the presence of two witnesses.

WILLIAM R. WILKINSON.

Witnesses:
J. L. DE LOACH,
F. C. SMITH.

Copies of this patent may be obtained for five cents each, by addressing the "Commissioner of Patents, Washington, D. C."